(12) United States Patent
Hailer (10) Patent No.: US 12,401,298 B2
(45) Date of Patent: Aug. 26, 2025

(54) METHOD AND SHELF STORAGE SYSTEM WITH INCREASED SAFETY WHEN STOPPING A STORAGE AND RETRIEVAL MACHINE

(71) Applicant: TGW Logistics GmbH, Marchtrenk (AT)

(72) Inventor: Emanuel Hailer, Gallspach (AT)

(73) Assignee: TGW Logistics GmbH, Marchtrenk (AT)

( * ) Notice: Subject to any disclaimer, the term of this patent is extended or adjusted under 35 U.S.C. 154(b) by 119 days.

(21) Appl. No.: 18/278,893

(22) PCT Filed: Feb. 28, 2022

(86) PCT No.: PCT/AT2022/060053
§ 371 (c)(1),
(2) Date: Aug. 25, 2023

(87) PCT Pub. No.: WO2022/178567
PCT Pub. Date: Sep. 1, 2022

(65) Prior Publication Data
US 2024/0136958 A1    Apr. 25, 2024
US 2024/0235435 A9    Jul. 11, 2024

(30) Foreign Application Priority Data

Feb. 26, 2021  (AT) .............................. A 50136/2021

(51) Int. Cl.
*B66F 9/24*       (2006.01)
*H02K 11/33*   (2016.01)
(Continued)

(52) U.S. Cl.
CPC .................. *H02P 3/22* (2013.01); *B66F 9/24* (2013.01); *H02K 11/33* (2016.01); *H02P 27/06* (2013.01)

(58) Field of Classification Search
CPC .... B66F 9/24; H02P 27/06; H02P 3/22; H02P 3/14; H02K 11/33
See application file for complete search history.

(56) References Cited

U.S. PATENT DOCUMENTS 6,923,612 B2   8/2005  Hansl
8,790,061 B2   7/2014  Yamashita
(Continued)

FOREIGN PATENT DOCUMENTS

DE   20 2004 004 620 U1   8/2004
EP         2 372 892 A1   10/2011
(Continued)

OTHER PUBLICATIONS

International Search Report in PCT/AT2022/060053, mailed Jul. 25, 2022.

*Primary Examiner* — Thai T Dinh
(74) *Attorney, Agent, or Firm* — Collard & Roe, P.C.

(57) ABSTRACT

In a method for operating a storage and retrieval unit with an inverter, which is connected to an energy store, and a drive motor, and a rack storage system including the storage and retrieval unit and the energy store, an electrical energy generated during the decelerating of the storage and retrieval unit is fed back into the energy store if a supply voltage for the inverter is above a first supply voltage threshold value and/or if the inverter is electrically connected to the energy store, and is otherwise fed into a braking resistor.

10 Claims, 4 Drawing Sheets

(51) Int. Cl.
*H02P 3/22* (2006.01)
*H02P 27/06* (2006.01)

(56) References Cited

U.S. PATENT DOCUMENTS

| | | | |
|---|---|---|---|
| 9,209,720 B2 * | 12/2015 | Feldman | G11B 19/2054 |
| 10,173,839 B2 | 1/2019 | Ahammer et al. | |
| 10,720,861 B2 * | 7/2020 | Fujii | H02P 3/22 |
| 10,823,783 B2 * | 11/2020 | Saito | H02P 27/06 |
| 11,325,477 B2 * | 5/2022 | Yuan | H02P 27/06 |
| 2021/0395015 A1 * | 12/2021 | Ahammer | B65G 1/06 |

FOREIGN PATENT DOCUMENTS

| | | |
|---|---|---|
| EP | 2 372 892 B1 | 3/2013 |
| EP | 2 419 365 B1 | 6/2013 |
| EP | 2 351 698 B1 | 8/2014 |
| EP | 3 543 200 A1 | 9/2019 |
| EP | 3 971 014 A1 | 3/2022 |
| JP | 2007-274756 A | 10/2007 |
| WO | 2012/106744 A1 | 8/2012 |
| WO | 2013/090970 A2 | 6/2013 |
| WO | 2016/094923 A2 | 6/2016 |
| WO | 2021/003881 A1 | 1/2021 |

* cited by examiner

METHOD AND SHELF STORAGE SYSTEM WITH INCREASED SAFETY WHEN STOPPING A STORAGE AND RETRIEVAL MACHINE

CROSS REFERENCE TO RELATED APPLICATIONS

This application is the National Stage of PCT/AT2022/060053 filed on Feb. 28, 2022, which claims priority under 35 U.S.C. § 119 of Austrian Application No. A 50136/2021 filed on Feb. 26, 2021, the disclosure of which is incorporated by reference. The international application under PCT article 21(2) was not published in English.

BACKGROUND OF THE INVENTION

1. Field of the Invention

The invention relates to a method for operating a storage and retrieval unit, in which the storage and retrieval unit comprises an inverter and a drive motor connectable thereto for the storage and retrieval unit, and in which the inverter is, at least temporarily, electrically connected to an energy store, which is connected to an electrical supply network via a supply circuit. The invention further relates to a rack storage system which comprises a storage and retrieval unit, which comprises an inverter and a drive motor connectable thereto for the storage and retrieval unit, an energy store, which is, at least temporarily, electrically connected to the inverter, and a supply circuit, which is connected to an electrical supply network and to the energy store.

2. Desription of the Related Art

Such a method and such a rack storage system are generally known. For example, EP 2 372 892 A1 discloses, in this context, a device and a method for temporarily storing electrical braking energy of a motor operated on an inverter. When a maximum voltage is reached on the energy store condenser, the braking resistor is activated, so that an emergency operation is possible and the motor can be braked despite the energy store condenser being full. As soon as the energy store condenser is at least partially discharged again, the energy store will take over the storing function again.

The arrangement disclosed in EP 2 372 892 A1, therefore, serves the protection of the energy store condenser and assumes that at least part of the recuperative energy can be fed back into the energy store condenser and only an excess energy, if any, is thermally converted. The braking resistor can accordingly be sized low. However, EP 2 372 892 A1 does not take into account an error case in which the electrical energy generated during the decelerating cannot be fed back into the energy store at all, for example due to a disruption in the electrical network.

SUMMARY OF THE INVENTION

It is therefore an object of the invention to specify an improved method and an improved rack storage system. In particular, a possibility is to be provided to electrically brake a storage and retrieval unit even if the electrical energy generated during the decelerating cannot be fed back into the energy store.

The object of the invention is achieved with a method of the kind mentioned in the beginning, in which an electrical energy generated during the decelerating of the storage and retrieval unit is fed back into the energy store if a supply voltage for the inverter is above a first supply voltage threshold value and/or if the inverter is electrically connected to the energy store and is fed into in a braking resistor if the supply voltage for the inverter is below the first supply voltage threshold value or below a lower, second supply voltage threshold value and/or if the inverter is electrically disconnected from the energy store.

The object of the invention is further achieved with a rack storage system of the kind mentioned in the beginning, which additionally comprises a drive motor switching element, which is configured for connecting the drive motor to the inverter if a supply voltage for the inverter is above a first supply voltage threshold value and/or if the inverter is electrically connected to the energy store and connecting the drive motor to the braking resistor if the supply voltage for the inverter is below the first supply voltage threshold value or below a lower, second supply voltage threshold value and/or if the inverter is electrically disconnected from the energy store.

The proposed measures ensure that a storage and retrieval unit can be electrically braked even if the electrical energy generated during the decelerating cannot be fed back into the energy store, for example due to a disruption in the electrical network or because the storage and retrieval unit is disconnected from the electrical network or from the energy store. A mechanical brake, in particular a self-holding mechanical brake, will therefore be obsolete. In particular, it is advantageous here that a storage and retrieval unit can be easily displaced by hand without further measures when the storage and retrieval unit has stopped, as the electronic brake has no, or only a negligible, effect in standstill or during slow travel.

In the present method, a procedure diametrical to EP 2 372 892 A1 is used for this because, there, a braking resistor is activated if the maximum voltage is reached on the energy store condenser, whereas, in the present method, the braking energy is fed into a braking resistor if the supply voltage for the inverter is below the first supply voltage threshold value or below a lower, second supply voltage threshold value and/or if the inverter is electrically disconnected from the energy store.

The energy store can in particular be configured as a stationary energy store. In particular, the energy store can be electrically connected to inverters of multiple storage and retrieval units. This means that the rack storage system has a hierarchical structure.

The storage and retrieval unit is configured for storing and/or retrieving unit loads in a storage rack of a rack storage system. Preferably, the storage and retrieval unit comprises a load handling device for storing and retrieving unit loads on storage locations in the rack storage system. Here, the load handling device can be arranged at and/or on a loading platform, wherein the loading platform forms a receiving surface for at least one unit load. It can be provided, in this case, that the storage and retrieval unit is configured as a multi-level storage and retrieval unit. The multi-level storage and retrieval unit has a mast, on which the loading platform can be moved. It can alternatively be provided that the storage and retrieval unit is configured as a single-level storage and retrieval unit, for example as a shuttle.

Advantageous designs and further advancements of the invention are discussed below.

It is favorable if a controllable drive motor switching element
- connects the drive motor to the inverter if the supply voltage for the inverter is above the first supply voltage threshold value and/or if the inverter is electrically connected to the energy store and
- connects the drive motor to the braking resistor if the supply voltage for the inverter is below the first supply voltage threshold value or below the lower, second supply voltage threshold value and/or if the inverter is electrically disconnected from the energy store.

The drive motor switching element can be configured as an electronic switching element, for example as a transistor, or as an electromechanical switching element, for example as a relay.

A first control for the controllable drive motor switching element can be configured here for detecting a supply voltage for the inverter and/or the status of an electrical connection between the inverter and the energy store and controlling the controllable drive motor switching element such
- that the controllable drive motor switching element connects the drive motor to the inverter if the first control for the controllable drive motor switching element establishes a supply voltage for the inverter above a first supply voltage threshold value and/or establishes that the inverter is electrically connected to the energy store, and
- that the controllable drive motor switching element connects the drive motor to the braking resistor if the first control for the controllable drive motor switching element establishes a supply voltage for the inverter below the first supply voltage threshold value or below a lower, second supply voltage threshold value, and/or establishes that the inverter is electrically disconnected from the energy store.

To that end, the first control for the controllable drive motor switching element is connected to a control input of the drive motor switching element, i.e. to a gate terminal or base terminal of a transistor or to a control coil of a relay, for example.

It is also advantageous if the drive motor switching element, in the method presented, comprises a drive motor relay, or is configured as such, and a switching contact of the drive motor relay
- connects the drive motor to the inverter if a control coil of the drive motor relay, which control coil acts on the switching contact and is arranged in a current path located between the switching contact and the energy store, is supplied with a voltage above a switch-on voltage of the drive motor relay and the drive motor relay is energized, and
- connects the inverter to the braking resistor if the voltage at the control coil is below a switch-off voltage of the drive motor relay and the drive motor relay is released.

In the same manner, it is of advantage if the drive motor switching element, in the rack storage system presented, comprises a drive motor relay, or is configured as such, and the drive motor is connectable to the inverter, or to the braking resistor, via a switching contact of the drive motor relay, and a control coil of the drive motor relay, which control coil acts on the switching contact, is arranged in a current path located between the switching contact and the energy store.

In this embodiment, a separate, first control for the drive motor switching element will be obsolete as the switching of the drive motor between the energy store and the braking resistor is taken over directly by the control coil of the drive motor relay. Therefore, this embodiment has a particularly simple structure and a particularly high reliability of operation.

It is further favorable if a controllable energy store switching element
- connects the inverter to the energy store if a line voltage of the electrical supply network is above a first line voltage threshold value and/or if the energy store is electrically connected to the electrical supply network, and
- disconnects the inverter from the energy store if the line voltage of the electrical supply network is below the first line voltage threshold value or below a lower, second line voltage threshold value and/or if the energy store is electrically disconnected from the electrical supply network.

The energy store switching element can also be configured as an electronic switching element, for example as a transistor, or as an electromechanical switching element, for example as a relay.

Using the energy store switching element, the storage and retrieval unit can be switched voltage-free. This can be done actively by a user, who wishes to maintain the storage and retrieval unit, for example, or on the basis of a status of the supply network. If the supply network fails, for example, persons who do not have detailed knowledge of the electrical configuration of the rack storage system could erroneously assume that the storage and retrieval unit is voltage-free upon failure of the supply network. However, due to the energy store, which may be charged with a life-threatening voltage even during failure of the supply network, this is not imperatively the case. Also, the storage and retrieval unit could move actively, and possibly uncontrollably, using the energy from the energy store. For safety reasons, the energy store is therefore disconnected from the storage and retrieval unit upon failure of the supply network, so that the access, for example to a rack aisle, is hazard-free.

A second control for the controllable energy store switching element can be configured here for detecting a line voltage of the electrical supply network and/or the status of an electrical connection between the energy store and the electrical supply network and controlling the controllable energy store switching element such
- that the controllable energy store switching element connects the inverter to the energy store if the second control for the controllable energy store switching element establishes a line voltage of the electrical supply network above a first line voltage threshold value and/or establishes that the inverter is electrically connected to the supply network, and
- that the controllable energy store switching element disconnects the inverter from the energy store if the second control for the controllable energy store switching element establishes a line voltage of the electrical supply network below the first line voltage threshold value or below a lower, second line voltage threshold value, and/or establishes that the inverter is electrically disconnected from the supply network.

To that end, the second control for the controllable energy store switching element is connected to a control input of the energy store switching element, i.e. to a gate terminal or base terminal of a transistor or to a control coil of a relay, for example.

It is also advantageous if the energy store switching element, in the method presented, comprises an energy store relay, or is configured as such, and a switching contact of the energy store relay connects the inverter to the energy store if a control coil of the energy store relay, which control coil acts on the switching contact and is arranged in a current path located between the energy store and the electrical supply network, is supplied with a voltage above a switching voltage of the energy store relay and the energy store relay is energized, and disconnects the inverter from the energy store if the voltage at the control coil is below the switching voltage of the energy store relay and the energy store relay is released.

In the same manner, it is of advantage if the energy store switching element, in the rack storage system presented, comprises an energy store relay, or is configured as such, and the inverter is connectable to, and disconnectable from, the energy store via a switching contact of the energy store relay and a control coil of the second relay, which control coil acts on the switching contact, is arranged in a current path located between the energy store and the supply network.

In this embodiment, a separate, second control for the energy store switching element will be obsolete as the connecting of the energy store to the inverter, and the disconnecting of the energy store from the inverter, is taken over directly by the control coil of the energy store relay. Therefore, this embodiment also has a particularly simple structure and a particularly high reliability of operation.

Generally, a disconnection of the energy store from the inverter also causes a switching of the drive motor to the braking resistor, either by evaluation of the switching state of the energy store switching element in the storage and retrieval unit or due to the voltage drop at the inverter associated with the disconnection. In a particularly advantageous manner, a switching cascade is thus formed.

It should therefore be noted in this context that the variants and advantages disclosed in relation to the method presented equally relate to the rack storage system presented, and vice versa.

BRIEF DESCRIPTION OF THE DRAWINGS

For the purpose of better understanding of the invention, it will be elucidated in more detail by means of the figures below.

These show in a respectively very simplified schematic representation.

DETAILED DESCRIPTION OF THE PREFERRED EMBODIMENTS

First of all, it is to be noted that, in the different embodiments described, equal parts are provided with equal reference numbers and/or equal component designations, where the disclosures filled into in the entire description may be analogously transferred to equal parts with equal reference numbers and/or equal component designations. Moreover, the specifications of location, such as at the top, at the bottom, at the side, chosen in the description refer to the directly described and depicted figure, and in case of a change of position, are to be analogously transferred to the new position.

Figure 1:
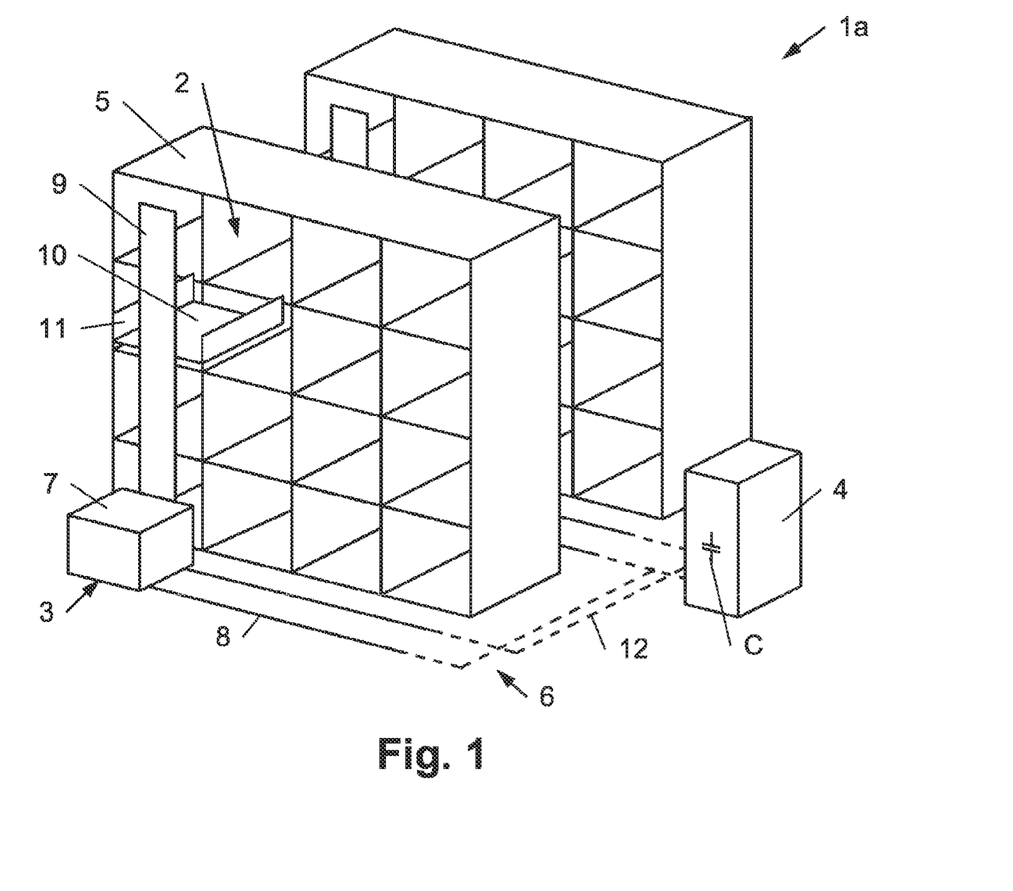
FIG. 1 a rack storage system schematically represented by way of example, with multiple multi-level storage and retrieval units and an assigned power supply.

FIG. 1 shows a rack storage system 1a with multiple storage locations 2 that are arranged next to one another and on top of one another, as well as with multiple computer-controlled storage and retrieval units 3, which are displaceable relative to the storage locations 2 (note: in FIG. 1, the rear storage and retrieval unit 3 is visible only in small part). The rack storage system 1a further comprises a power supply 4 for the storage and retrieval units 3, as well as an energy store C, which is integrated into the power supply 4 in the example shown.

In this example, the storage locations 2 are organized in rack rows 5, which are arranged adjacent to rack aisles 6 and can receive, in a depth direction, only one unit load (single-deep storage) or multiple unit loads (multiple-deep storage). The storage and retrieval units 3 are configured as multi-level storage and retrieval units and respectively comprise a chassis 7, which is displaceable on rails 8, as well as a mast 9, which is connected to the chassis 7. In FIG. 1, the storage and retrieval unit 3 travels respectively on two rails 8, but evidently a storage and retrieval unit 3 may also travel on only one rail 8, which can in particular be configured as an I profile.

The multi-level storage and retrieval unit 3 further comprises a loading platform 10 displaceable (liftable and lowerable) on the mast 9. On the loading platform 10, a load handling device 11 for storing the unit loads on the storage locations 2 and retrieving the unit loads from the storage locations 2 is arranged. The loading platform 10 forms a receiving surface for at least one unit load. Such a multi-level storage and retrieval unit 3 is disclosed, for example, in EP 2 419 365 B1 and is a subject-matter of this disclosure. Using the multi-level storage and retrieval units 3, unit loads can be stored in a storage location 2, or be retrieved from same, in a manner generally known. Here, the respective unit load is transported from a supply plant, which is not represented, to the storage location 2 or from the storage location 2 to a discharge plant, which is not represented, using the loading platform 10. The supply plant and/or discharge plant can be configured as (a) roller conveyor(s), for example.

The power supply 4 is electrically connected to the rails 8 and/or to the multi-level storage and retrieval units 3 via power lines 12, so that electrical drive motors of the multi-level storage and retrieval units 3 can be supplied with electrical energy. A first drive motor (travel drive) serves the travel movement of the multi-level storage and retrieval unit 3 along the rack aisle 6, a second drive motor (lifting drive) serves a lifting and lowering movement of the loading platform 10 and a third drive motor (storage and retrieval drive) serves a retraction and extension movement of the load handling device 11. The load handling device 11, in turn, can comprise at least one fourth drive motor, which serves an adjustment movement of a transport element for transporting unit loads between the storage location 2 and the loading platform 10. Evidently, the power transmission can also be done differently, for example via trailing cable. In the example shown, the power supply 4 is assigned to two multi-level storage and retrieval units 3. Evidently, the power supply 4 could also supply more than two multi-level storage and retrieval units 3, or one power supply 4 could respectively be assigned to one multi-level storage and retrieval unit 3 each.

According to one possible embodiment, the load handling device 11 comprises telescopic arms, which are arranged at and/or on the loading platform 10 and comprise slides, each of which are retractable/extendable perpendicular to the rack aisle 6. The external slide of the telescopic arms comprises transport elements that are arranged at least on its opposite ends and are adjustable relative to the loading platform 10, by means of which transport elements a unit load to be stored or retrieved can be seized from the rear. Such a load handling device 11 is known, for example, from DE 20 2004 004 620 U1 and U.S. Pat. No. 6,923,612 B2 and is a subject-matter of this disclosure.

In this embodiment variant, the energy store C is housed directly in the power supply 4 in a joint switch cabinet. Evidently, the energy store C could also be housed in a separate housing. Furthermore, it should be noted that the switch cabinet of the power supply 4 can also house other electrical/electronic devices for operating the multi-level storage and retrieval units 3, for example protective switches, protections, controls, measuring devices and suchlike. Evidently, also the multi-level storage and retrieval unit 3 can house electrical/electronic devices for operating the multi-level storage and retrieval units 3, in particular a control for same.

The energy store C generally serves to store a generator-produced energy during the braking of a multi-level storage and retrieval unit 3 and release it again as and when needed, i.e. during acceleration of this, or of another, multi-level storage and retrieval unit 3. In this manner, power peaks in the supply line to the power supply 4 are avoided, and the energy need of the rack storage system 1a is reduced. Here, the aforesaid refers not only to the braking and accelerating of the chassis 7, for example, but also to all movable parts of the multi-level storage and retrieval unit 3, in particular, therefore, also to the lifting and lowering movement of the loading platform 10.

As represented in FIG. 1, the energy store C is connected not to the storage and retrieval unit 3 but to a (stationary) power supply 4 for the storage and retrieval units 3 in order to feed the generator-produced energy of the drive motors of the storage and retrieval units 3 into the energy store C via the (bidirectionally acting) power supply.

In the example above, it was assumed that the storage and retrieval units 3 are configured as multi-level storage and retrieval units and the power supply 4 and the energy store C are assigned to the storage and retrieval units 3 of multiple rack aisles 6. Yet this is by no means the only conceivable possibility. For example, the rack storage system 1a may also have only one rack aisle 6. It is also possible that at least one multi-level storage and retrieval unit each is arranged in levels located top of one another in the single rack aisle 6, or in the multiple rack aisles 6. This results in storage regions, in which the storage locations 2 are located, each of which is assigned one multi-level storage and retrieval unit. In this embodiment, the power supply 4 and the energy store C are assigned to multiple multi-level storage and retrieval units 3 of a rack aisle 6. If only one rack aisle 6 and one multi-level storage and retrieval unit 3 in this rack aisle 6 are provided, the power supply 4 and the energy store C are assigned to only this multi-level storage and retrieval unit 3.

It is also conceivable that the storage and retrieval units are configured as single-level storage and retrieval units. In particular, the power supply 4 and the energy store C can be assigned to single-level storage and retrieval units of multiple levels of a rack aisle 6, wherein the storage locations 2, in turn, are organized in rack rows 5, which are arranged adjacent to at least one rack aisle 6.

Figure 2:
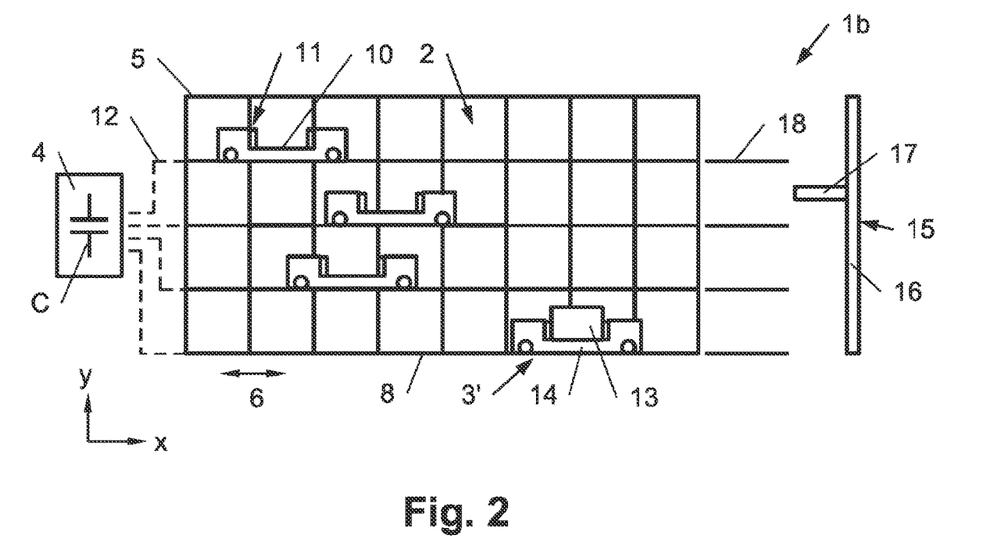
FIG. 2 a front view onto a rack storage system with multiple single-level storage and retrieval units that are supplied by one power supply.

In this context, FIG. 2 shows an example of a rack storage system 1b with a rack row 5 with multiple storage locations 2, which are arranged in four levels. In each level, one single-level storage and retrieval unit 3' is provided, which can convey unit loads 13 from and to the storage locations 2 of a level. The storage and retrieval units are configured as single-level storage and retrieval units 3' and respectively comprise a chassis 14, which is displaceable on rails 8, as well as a loading platform 10. On and/or at the loading platform 10, a load handling device 11 for storing the unit loads 13 on the storage locations 2 and retrieving the unit loads 13 from the storage locations 2 is arranged. The loading platform 10 forms a receiving surface for at least one unit load 13. Such a single-level storage and retrieval unit 3' and such a load handling device 11 are disclosed, for example, in WO 2013/090970 A2 or EP 2 351 698 B 1 and are a subject-matter of this disclosure.

The load handling device 11 comprises telescopic arms, which are arranged on and/or at the loading platform 10 and comprise slides, which are respectively retractable/extendable perpendicular to the rack aisle 6. The external slide of the telescopic arms comprises transport elements that are arranged on its opposite ends and therebetween and are adjustable relative to the loading platform 10, by means of which transport elements a unit load 13 to be stored or retrieved can be seized from the rear.

Even though the embodiment shown comprises a single-level storage and retrieval unit 3' in each level, it is equally possible that only some of the levels comprise a single-level storage and retrieval unit 3'. In this case, a lifting device for single-level storage and retrieval units 3' is provided, which can take over a single-level storage and retrieval unit 3' from one level and relocate it to another level. Such a lifting device is described in WO 2012/106744 A1, for example.

Additionally, a lift 15 is provided upstream of the rack row 5, which lift 15 comprises a mast 16 and a loading platform 17 displaceable thereupon. During storing, a unit load 13 to be stored is dispensed from the loading platform 17 onto a provisioning device 18. This unit load 13 remains on the provisioning device 18 until the single-level storage and retrieval unit 3' picks up the unit load 13. The single-level storage and retrieval unit 3' takes over the unit load 13 and conveys it to its storage location 2. During retrieval, the opposite operation is performed. Here, the combination of the single-level storage and retrieval units 3' and of the lift 15 fulfill essentially the same function as a multi-level storage and retrieval unit 3a, 3a'. The lift 15 can in particular also be provided in the form of a paternoster.

The power supply 4 is electrically connected to the rails 8 and/or to the single-level storage and retrieval units 3' per level via power lines 12, so that electrical drive motors of the single-level storage and retrieval units 3' can be supplied with electrical energy. A first drive motor (travel drive) serves the travel movement of a single-level storage and retrieval unit 3' along the rack aisle 6, a second drive motor (storage and retrieval drive) serves a retraction and extension movement of the load handling device 11. The load handling device 11, in turn, may comprise at least one third drive motor, which serves the adjustment movement of a transport element for transporting unit loads 13 between the storage location 2 and the loading platform 10.

Evidently, the power transmission can also be done differently, for example via a conductor line, such as this is described in WO 2013/090970 A2, for example. In the example shown, the power supply 4 is assigned to all single-level storage and retrieval units 3'.

What has been said in relation to FIG. 1 analogously applies to the embodiment according to FIG. 2, wherein the power supply 4 and the energy store C are assigned to storage and retrieval units 3' of multiple levels of a rack aisle 6. Additionally, the power supply 4 and the energy store C can also be assigned to the lift 15 and utilize its generator-produced energy.

Figure 3:
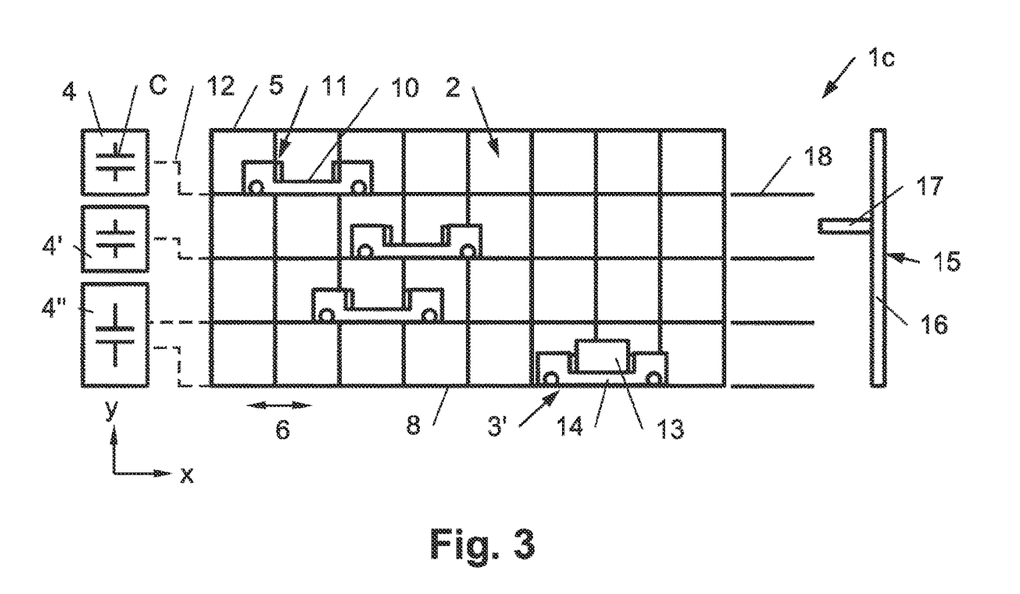
FIG. 3 a front view onto a rack storage system with multiple single-level storage and retrieval units that are supplied by multiple power supplies.

FIG. 3 shows an embodiment in which a first power supply 4 is assigned to a first travel plane, a second power supply 4' to a second travel plane and a third power supply 4" to a third and fourth travel plane. Some of the single-level storage and retrieval units 3' are therefore supplied with electrical energy from different power supplies 4 . . . 4". Here, the power supplies 4 . . . 4" have one energy store C each. The electrical energy that is generator-produced during the braking of a single-level storage and retrieval unit 3' is stored in the energy store C of the assigned power supply 4 . . . 4" and used at a later point in time for the acceleration of this, or of another, single-level storage and retrieval unit 3'.

This embodiment proves of advantage in particular in large rack storage systems 1c as, in case of disruption on a power supply 4 . . . 4" and/or on an energy store C, only the single-level storage and retrieval unit 3', or the group of single-level storage and retrieval units 3', which is/are assigned to the respective power supply 4 . . . 4" and/or to the respective energy store C need be shut down. The other single-level storage and retrieval units 3', or the other group(s) of single level storage and retrieval units 3', can continue to be operated normally. This ensures that a high plant availability of the rack storage system 1c is achieved.

What has been said in relation to FIG. 1 analogously applies to the embodiment according to FIG. 3. Additionally, a power supply 4 . . . 4" and an energy store C can, also here, be assigned to the lift 15 and utilize its generator-produced energy.

FIGS. 4 to 8 show electrical circuit diagrams of possible embodiments for supplying storage and retrieval units 3a . . . 3e with electrical energy using power supplies 4a . . . 4e.

Figure 4:
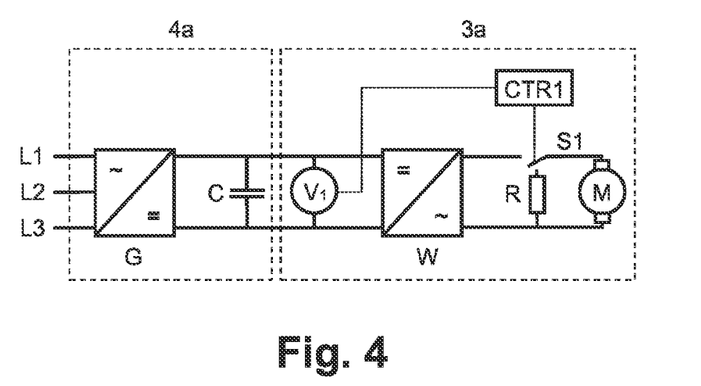
FIG. 4 an electrical basic circuit diagram of a rack storage system with a controlled drive motor switching element.

Specifically, the embodiment according to FIG. 4 comprises a power supply 4a and a storage and retrieval unit 3a electrically connected thereto. The storage and retrieval unit 3a has a drive motor M, an inverter W, a braking resistor R, a drive motor switching element S1, a first control CTR1, as well as a device for measuring a first supply voltage $V_1$ for the inverter W. The power supply 4a has a supply circuit G, which is configured as a rectifier in the present example, and an energy store C electrically connected thereto. Furthermore, the rectifier G has three connections to an electrical supply network L1 . . . L3. The drive motor M is connectable optionally to the braking resistor R or to the inverter W with the drive motor switching element S1. A connecting piece located between the power supply 4a and the storage and retrieval unit 3a for provisioning an electrical connection between the power supply 4a and the storage and retrieval unit 3a can comprise the rails 8 and/or the wiring 12, for example.

During acceleration and to maintain a movement, the storage and retrieval unit 3a obtains electrical energy from the electrical supply network L1 . . . L3 via the inverter W and the rectifier G. A three-phase AC voltage in the electrical supply network L1 . . . L3 is converted to a DC voltage using the rectifier G, which DC voltage is smoothed by means of the energy store C and supplied to the inverter W. The inverter W converts the DC voltage back to an AC voltage, with which the drive motor M is driven. Here, the drive motor switching element S1 is in a position in which the drive motor M is connected to the inverter W.

In relation to the decelerating of the storage and retrieval unit 3a, distinction is to be made between two cases: An electrical energy generated during the decelerating of the storage and retrieval unit 3a
  is fed back into the energy store C if a supply voltage $V_1$ for the inverter W is above a first supply voltage threshold value, and
  is fed into the braking resistor R if the supply voltage $V_1$ for the inverter W is below the first supply voltage threshold value or below a lower, second supply voltage threshold value.

To that end, the supply voltage $V_1$ at the input of the inverter W is measured and evaluated by the first control CTR1, in this embodiment. The first control CTR1 controls the drive motor switching element S1 such that it
  connects the drive motor M to the inverter W if the supply voltage $V_1$ for the inverter W is above the first supply voltage threshold value, and
  connects the drive motor M to the braking resistor R if the supply voltage $V_1$ for the inverter W is below the first supply voltage threshold value or below the lower, second supply voltage threshold value.

The drive motor switching element S1 can be configured as an electronic switching element, for example as a transistor, or as an electromechanical switching element, for example as a relay. To control the drive motor switching element S1, the first control CTR1 can be connected to a control input of the drive motor switching element S1, i.e. to a gate terminal or base terminal of a transistor or to a control coil of a relay, for example.

The first supply voltage threshold value, and optionally the second supply voltage threshold value, are selected such that the inverter W and its control, as well as the first control CTR1, are supplied with a sufficient amount of electrical energy and remain functional at least until the switching of the drive motor M to the braking resistor R. At the latest once the sufficient supply of the inverter W and its control, as well as of the first control CTR1, is no longer ensured, the drive motor M is switched to the braking resistor R. Here, the switching state of the drive motor switching element S1 should be maintained even if the voltage keeps going down further. These measures ensure that the storage and retrieval unit 3a can be electrically braked even if the electrical energy generated during the decelerating cannot be fed back into the energy store C, for example because there is a disruption in the electrical network and the inverter W and its control are no longer sufficiently supplied and therefore fail.

A mechanical brake, in particular a self-holding mechanical brake, will be obsolete. In particular, it is advantageous here that, after stopping, the storage and retrieval unit 3*a* can be easily displaced by hand without further measures as the brake using the braking resistor R has no, or only a negligible, effect in standstill or during slow travel.

Figure 5:
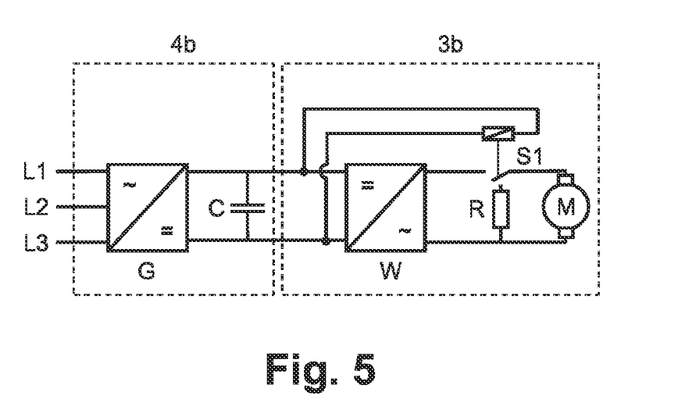
FIG. 5 an electrical basic circuit diagram of a rack storage system with a drive motor switching element that is configured as a relay and whose control coil is connected to the inverter input.

To simplify the control of the drive motor switching element S1 and to increase the reliability of operation of the rack storage system 1*a* . . . 1*c*, also an arrangement according to FIG. 5 may be provided. Here, the power supply 4*b* of FIG. 5 resembles the power supply 4*a* of FIG. 4, and the storage and retrieval unit 3*b* of FIG. 5 is similar to the storage and retrieval unit 3*a* of FIG. 4. In this embodiment, the drive motor switching element S1 of the storage and retrieval unit 3*b* comprises a drive motor relay, or is configured as such, and accordingly has a switching contact and a control coil acting on the switching contact. Here, the control coil is arranged in a current path located between the switching contact of the relay and the energy store C, in particular in a current path located between the inverter W and the energy store C, such as this is the case in FIG. 5.

In this embodiment, the switching contact of the drive motor relay connects
the drive motor M to the inverter W if the control coil of the drive motor relay is supplied with a voltage above a switch-on voltage of the drive motor relay and the drive motor relay is energized, and
the drive motor M to the braking resistor R if the voltage at the control coil is below a switch-off voltage of the drive motor relay and the drive motor relay is released.

In this embodiment, a separate control CTR1 for the drive motor switching element S1 will therefore be obsolete as the switching of the drive motor M between the energy store C and the braking resistor R is taken over directly by the control coil of the drive motor relay. Therefore, this embodiment has a particularly simple structure and a particularly high reliability of operation.

Figure 6:
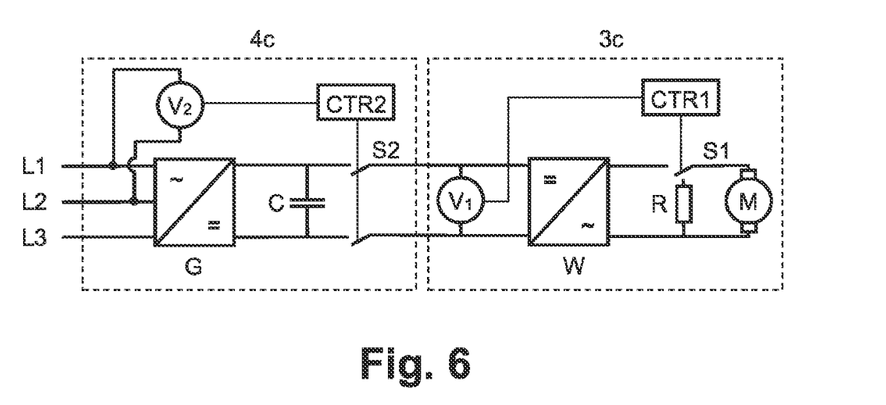
FIG. 6 like FIG. 4 but with a controlled energy store switching element.

FIG. 6 shows another embodiment with a storage and retrieval unit 3*c* and a power supply 4*c*, which is very similar to the embodiment represented in FIG. 4. In contrast to the latter, a controllable energy store switching element S2 is provided between the energy store C and the inverter W. Furthermore, the power supply 4*c* comprises a second control CTR2, as well as a device for measuring the line voltage $V_2$ of the electrical supply network L1 . . . L3.

The second control CTR2 for the controllable energy store switching element S2 can be configured for detecting the line voltage $V_2$ of the electrical supply network L1 . . . L3 and/or the status of an electrical connection between the energy store C and the electrical supply network L1 . . . L3. The second control CTR2 controls the energy store switching element S2 such that it
connects the inverter W with the energy store C if a line voltage $V_2$ of the electrical supply network L1 . . . L3 is above a first line voltage threshold value and/or if the energy store C is electrically connected to the electrical supply network L1 . . . L3, and
disconnects the inverter W from the energy store C if the line voltage $V_2$ of the electrical supply network L1 . . . L3 is below the first line voltage threshold value or below a lower, second line voltage threshold value and/or if the energy store C is electrically disconnected from the electrical supply network L1 . . . L3.

The energy store switching element S2 can, again, be configured as an electronic switching element, for example as a transistor, or as an electromechanical switching element, for example as a relay. The second control CTR2 is connected to a control input of the energy store switching element S2, i.e. to a gate terminal or base terminal of a transistor or to a control coil of a relay, for example.

Using the energy store switching element S2, the storage and retrieval unit 3*c* and the rails 8 can be switched voltage-free. This can be done actively by a user, who wishes to enter the rack aisle 6 or maintain the storage and retrieval unit 3*c*, for example, or on the basis of the status of the supply network L1 . . . L3, as mentioned above. If the supply network fails, persons who do not have detailed knowledge of the electrical configuration of the rack storage system 1*a* . . . 1*c* could erroneously assume that the storage and retrieval unit 3*c* and the rails 8 are voltage-free upon failure of the supply network L1 . . . L3. However, due to the energy store C, which may be charged with a life-threatening voltage even during failure of the supply network L1 . . . L3, this is not imperatively the case. Also, the storage and retrieval unit 3*c* could move actively, and possibly uncontrollably, using the energy from the energy store C. For safety reasons, the energy store C is therefore disconnected from the storage and retrieval unit 3*c* and from the rails 8 upon failure of the supply network L1 . . . L3, so that the access to the rack aisle 6 is hazard-free.

The status of the supply network L1 . . . L3 can be determined by measuring the second line voltage $V_2$ or by receiving a notification from another unit, which monitors the status of the supply network L1 . . . L3. For example, a central monitoring unit at the network access point of the rack storage system 1*a* . . . 1*c* could issue a corresponding notification if it registers a malfunction of the supply network L1 . . . L3.

Figure 7:
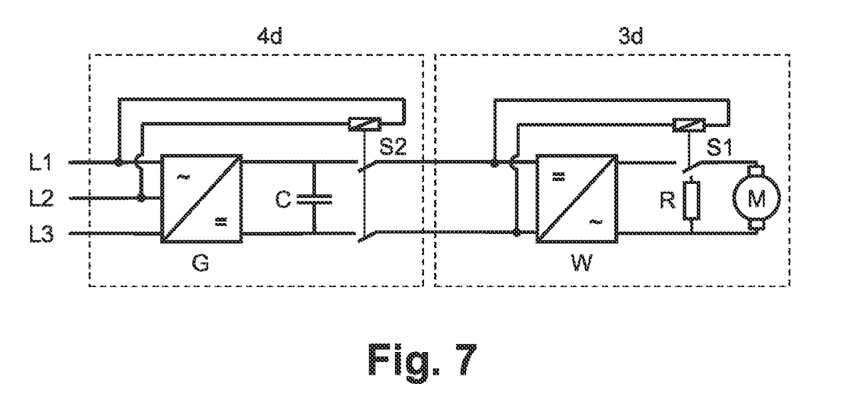
FIG. 7 like FIG. 5 but with an energy store switching element that is configured as a relay and whose control coil is connected to the rectifier input.

To simplify the control of the energy store switching element S2 and to increase the reliability of operation of the rack storage system 1*a* . . . 1*c*, also an arrangement according to FIG. 7 may be provided, with a storage and retrieval unit 3*d* which resembles the storage and retrieval unit 3*b* from FIG. 5 and a power supply 4*d*, which is very similar to that of FIG. 6. In this embodiment, the energy store switching element S2 comprises an energy store relay, or is configured as such, and accordingly has a switching contact and a control coil acting on the switching contact. The control coil is arranged in a current path located between the energy store C and the electrical supply network L1 . . . L3.

In this embodiment, the switching contact of the energy store relay connects
the inverter W to the energy store C if a control coil of the energy store relay, which control coil acts on the switching contact and is arranged in a current path located between the energy store C and the electrical supply network L1 . . . L3, is supplied with a voltage above a switching voltage of the energy store relay and the energy store relay is energized, and
disconnects the inverter W from the energy store C if the voltage at the control coil is below the switching voltage of the energy store relay and the energy store relay is released.

In this embodiment, a separate control for the energy store switching element S2 will be obsolete as the connecting of the energy store C to the inverter W, and the disconnecting of the energy store C from the inverter W, is taken over directly by the control coil of the energy store relay. Therefore, this embodiment also has a particularly simple structure and a particularly high reliability of operation.

Figure 8:
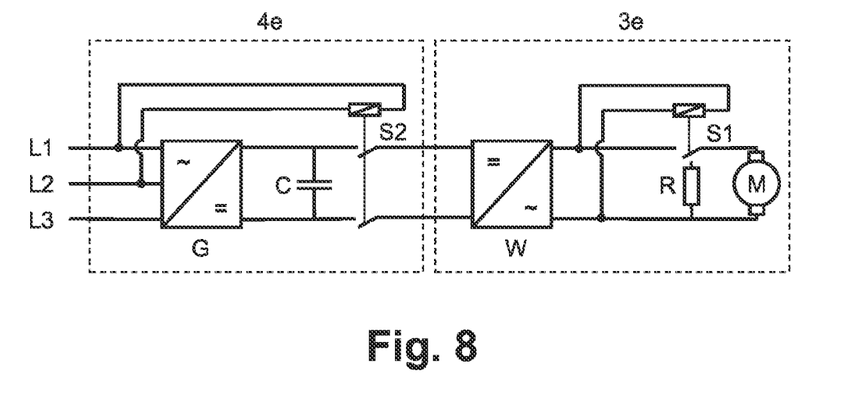
FIG. 8 like FIG. 7 but with a drive motor switching element whose control coil is connected to the inverter output.

FIG. 8 finally shows an embodiment similar to FIG. 7. In contrast to the latter, the control coil of the drive motor switching element S1 is connected in the part of the electric circuit located between the inverter W and the braking resistor R. The control coil is accordingly operated with an AC voltage and not, as in FIG. 7, with a DC voltage. However, the remaining functioning is identical. The storage and retrieval unit 3e represented in FIG. 8 can furthermore also be applied in the arrangement represented in FIG. 5. It should also be noted in this context that the voltage applied to the control coil is influenced by and/or depends on the supply voltage $V_1$ for the inverter W.

In the examples mentioned up to this point, the supply voltage $V_1$ for the inverter W was used as a parameter for determining where an electrical energy generated during the decelerating of the storage and retrieval unit 3, 3', 3a . . . 3e is fed. However, this procedure is not imperative. It is also conceivable that it is checked, to this end, whether or not the inverter W is electrically connected to the energy store C. For example, the switching state of the energy store switching element S2, or also the status of the supply network L1 . . . L3, can be evaluated for this purpose, for example at the network access point of the rack storage system 1a . . . 1c.

An electrical energy generated during the decelerating of the storage and retrieval unit 3, 3', 3a . . . 3e can therefore also
- be fed back into the energy store C if the inverter W is electrically connected to the energy store C, and
- be fed into a braking resistor R if the inverter W is electrically disconnected from the energy store C.

In particular, the controllable drive motor switching element S1 can
- connect the drive motor M to the inverter W if the inverter W is electrically connected to the energy store C, and
- connect the drive motor M to the braking resistor R if the inverter W is electrically disconnected from the energy store C.

This, therefore, results in a switching cascade. If the energy store switching element S2 disconnects the energy store C from the inverter W, also the drive motor M will subsequently be disconnected from the inverter W and connected to the braking resistor R instead.

In FIGS. 4 to 8, the energy store C is configured as a stationary energy store C and connected to respectively one inverter W. Yet, the energy store C could also be electrically connected to inverters W of multiple storage and retrieval units 3, 3', 3a . . . 3e (cf. also FIGS. 1 to 3).

The drive motor M represented in FIGS. 4 to 8 is not limited with respect to its function and could therefore serve the travel movement of the storage and retrieval unit 3, 3', 3a, and 3e, the lifting and lowering movement of the loading platform 10 or also the retraction and extension movement of the load handling device 11. The drive motor M can also be representative of multiple, or all, drives of the storage and retrieval unit 3, 3', 3a . . . 3e.

Finally, it should be noted that the scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

In particular, it should also be noted that, in reality, the depicted devices can also comprise more, or also fewer, components than depicted. In some cases, the shown devices and/or their components may not be depicted to scale and/or be enlarged and/or reduced in size.

TABLE OF REFERENCE NUMBERS

1a . . . 1c rack storage system
2 storage location
3, 3', 3a . . . 3e storage and retrieval unit
4 . . . 4", 4a . . . 4e power supply
5 rack row
6 rack aisle
7 chassis
8 rail
9 mast
10 loading platform
11 load handling device
12 wiring
13 unit load
14 chassis
15 lift
16 mast
17 loading platform
18 provisioning device
C energy store
CTR1, CTR2 control
G supply circuit
L1 . . . L3 supply network
M drive motor
R braking resistor
S1 drive motor switching element
S2 energy store switching element
$V_1$ supply voltage for the inverter
$V_2$ line voltage of the electrical supply network
W inverter

The invention claimed is:

1. A method for operating a storage and retrieval unit, wherein the storage and retrieval unit comprises an inverter and a drive motor connectable thereto for the storage and retrieval unit,
wherein the inverter is, at least temporarily, electrically connected to an energy store, which is connected to an electrical supply network via a supply circuit, and
wherein an electrical energy generated during the decelerating of the storage and retrieval unit
is fed back into the energy store if a supply voltage for the inverter is above a first supply voltage threshold value and/or if the inverter is electrically connected to the energy store, and
is fed into a braking resistor if the supply voltage for the inverter is below the first supply voltage threshold value or below a lower, second supply voltage threshold value and/or if the inverter is electrically disconnected from the energy store.

2. The method according to claim 1, wherein a controllable drive motor switching element
connects the drive motor to the inverter if the supply voltage for the inverter is above the first supply voltage threshold value and/or if the inverter is electrically connected to the energy store, and
connects the drive motor to the braking resistor if the supply voltage for the inverter is below the first supply voltage threshold value or below the lower, second supply voltage threshold value and/or if the inverter is electrically disconnected from the energy store.

3. The method according to claim 2, wherein the drive motor switching element comprises a drive motor relay, or is configured as a drive motor relay, and a switching contact of the drive motor relay
connects the drive motor to the inverter if a control coil of the drive motor relay, the control coil acting on the switching contact and being arranged in a current path located between the switching contact and the energy store, is supplied with a voltage above a switch-on voltage of the drive motor relay and the drive motor relay is energized, and connects the drive motor to the braking resistor if the voltage at the control coil is below a switch-off voltage of the drive motor relay and the drive motor relay is released.

4. The method according to claim 1, wherein a controllable energy store switching element connects the inverter to the energy store if a line voltage of the electrical supply network is above a first line voltage threshold value and/or if the energy store is electrically connected to the electrical supply network, and disconnects the inverter from the energy store if the line voltage of the electrical supply network is below the first line voltage threshold value or below a lower, second line voltage threshold value and/or if the energy store is electrically disconnected from the electrical supply network.

5. The method according to claim 4, wherein the energy store switching element comprises an energy store relay, or is configured as an energy store relay, and a switching contact of the energy store relay connects the inverter to the energy store if a control coil of the energy store relay, the control coil acting on the switching contact and being arranged in a current path located between the energy store and the electrical supply network, is supplied with a voltage above a switching voltage of the energy store relay and the energy store relay is energized, and disconnects the inverter from the energy store if the voltage at the control coil is below the switching voltage of the energy store relay and the energy store relay is released.

6. A rack storage system, comprising a storage and retrieval unit, which comprises an inverter and a drive motor connectable thereto for the storage and retrieval unit, an energy store, which is, at least temporarily, electrically connected to the inverter, a supply circuit, which is connected to an electrical supply network and to the energy store, and a drive motor switching element, which is configured for
connecting the drive motor to the inverter if a supply voltage for the inverter is above a first supply voltage threshold value and/or if the inverter is electrically connected to the energy store, and connecting the drive motor to the braking resistor if the supply voltage for the inverter is below the first supply voltage threshold value or below a lower, second supply voltage threshold value and/or if the inverter is electrically disconnected from the energy store.

7. The rack storage system according to claim 6, wherein the energy store is configured as a stationary energy store and is connected to inverters of multiple storage and retrieval units.

8. The rack storage system according to claim 6, wherein the drive motor switching element comprises a drive motor relay, or is configured as a drive motor relay, and the drive motor is connectable to the inverter, or to the braking resistor, via a switching contact of the drive motor relay, and a control coil of the drive motor relay, the control coil acting on the switching contact, is arranged in a current path located between the switching contact and the energy store.

9. The rack storage system according to claim 6, further comprising a controllable energy store switching element, which is configured for connecting the inverter to the energy store if a line voltage of the electrical supply network is above a first line voltage threshold value and/or if the energy store is electrically connected to the electrical supply network, and disconnecting the inverter from the energy store if the line voltage of the electrical supply network is below the first line voltage threshold value or below a lower, second line voltage threshold value and/or if the energy store is electrically disconnected from the electrical supply network.

10. The rack storage system according to claim 9, wherein the energy store switching element comprises an energy store relay, or is configured as an energy store relay, and the inverter is connectable to, and disconnectable from, the energy store via a switching contact of the energy store relay, and a control coil of the energy storage relay, the control coil acting on the switching contact, is arranged in a current path located between the energy store and the electrical supply network.

\* \* \* \* \*